UNITED STATES PATENT OFFICE.

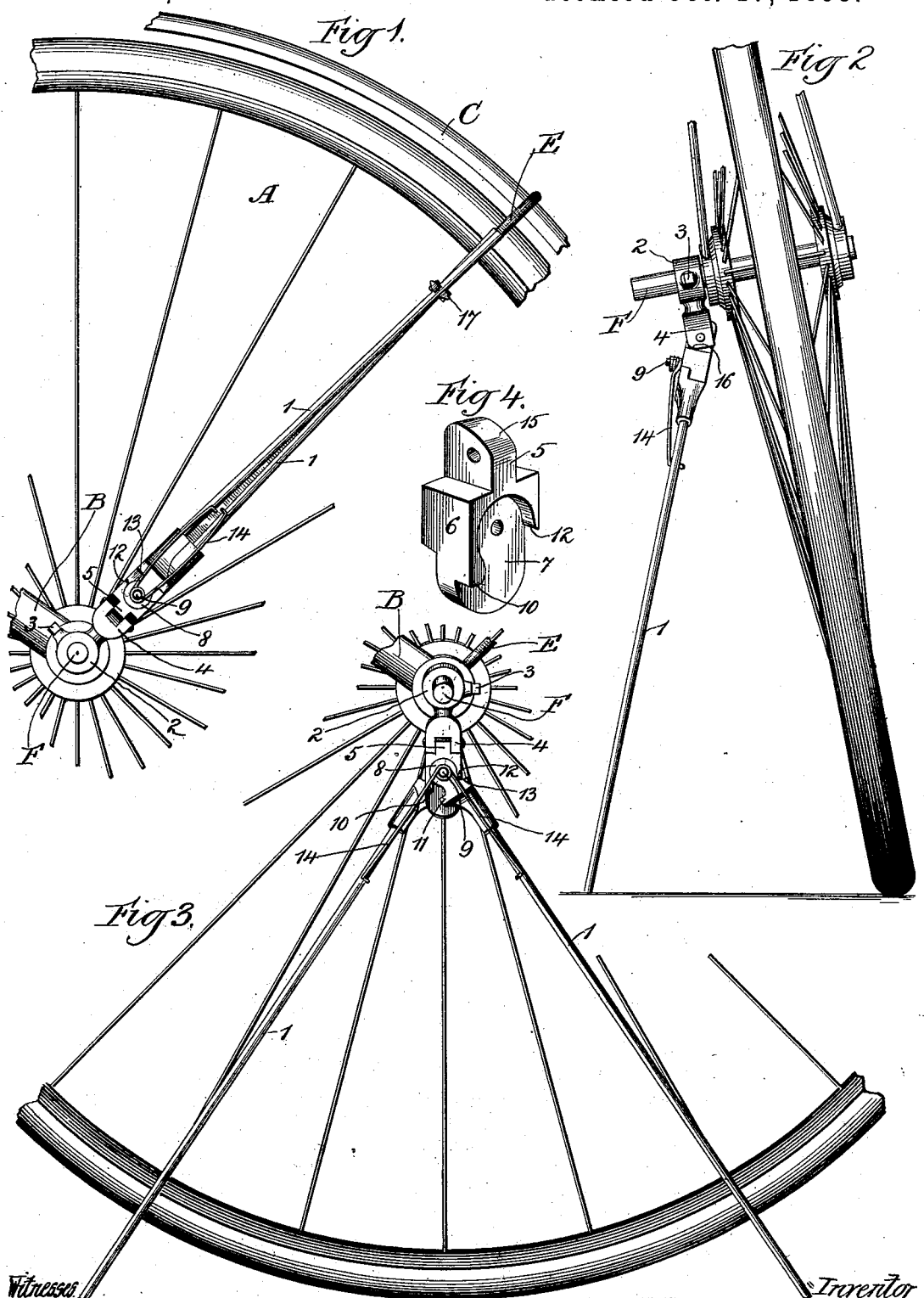

GUSTAVE W. BERT, OF CHICAGO, ILLINOIS.

BICYCLE-SUPPORT.

SPECIFICATION forming part of Letters Patent No. 507,062, dated October 17, 1893.

Application filed November 8, 1892. Serial No. 451,319. (No model.)

*To all whom it may concern:*

Be it known that I, GUSTAVE W. BERT, a citizen of the United States, residing at Chicago, in the county of Cook and State of Illinois, have invented certain new and useful Improvements in Bicycle-Supports; and I do hereby declare the following to be a full, clear, and exact description of the invention, such as will enable others skilled in the art to which it appertains to make and use the same.

This invention relates to a novel construction in a bicycle support, the object being to provide a device of this character of simple and durable construction that can be readily attached to a bicycle, and which when not in use will be out of the way of the rider, but which can be easily brought into position to support the machine after the rider dismounts.

The invention consists in the features of construction and in the combinations of parts hereinafter fully described and specifically claimed.

In the accompanying drawings illustrating my invention,—Figure 1 is a fragmentary view of the rear wheel and adjoining framework of a bicycle provided with a supporting device constructed in accordance with my invention, and illustrating such device in the position it will assume when not in use. Fig. 2 is a fragmentary end view of a bicycle provided with a supporting device constructed in accordance with my invention and illustrating the same as supporting said bicycle. Fig. 3 is a side view of the same. Fig. 4 is a detail view on an enlarged scale.

Referring now to said drawings, A indicates a bicycle wheel, B one of the frame pieces, C the mud guard, E the bar supporting the rear end portion of said mud guard, and F the axle.

In the accompanying drawings I have shown my invention as attached to a projecting part of the axle of a bicycle, but it will of course be understood that it can be attached to any other projection convenient for the purpose.

In accordance with the principle involved by my invention I provide two supporting legs 1 that are constructed so that they can spread apart and be thrown at an angle to the wheel, as shown in Figs. 2 and 3, that said wheel can be inclined to one side and supported in this position by said outspread legs. A projection 2 is revolubly mounted upon the axle F of the bicycle and is prevented from displacement endwise by means of a screw 3 that passes through the portion of said projection embracing the axle and engaging an annular groove in said axle in a familiar manner. The end of said projection 2 is bifurcated, as shown at 4, and a lug 5 on the socket piece 6 is pivoted between the bifurcated end portion 4 of said projection. The said socket piece 6 is provided on its sides with sockets 7 that receive the heads 8 to which the legs 1 are secured, one head being placed in each socket and secured therein by a pivot pin 9 passing through said parts. The rear walls of said sockets 7 are curved concentrically with the pivot opening therein, and the heads 8 are circular and fit within the curved portions of said sockets 7 so as to provide an ample bearing for said parts. The said sockets are also provided at one side with a shoulder or projection 10 to engage a lug 11 on one side of the head 8 when the said head and legs 1 are in alignment with the socket piece 6, as shown in Fig. 1, while the other side of the socket is provided with a shoulder 12 that is adapted to engage a lug 13 on the head 8 when the legs are spread apart, as shown in Figs. 2 and 3. Spring 14 has a coiled portion that fits upon the pivot pin 9 while its arms extend outwardly and are hooked to engage the legs 1, said spring exerting a tendency to spread said legs apart. The lug 5 on the upper end of the socket piece 6 is cut away at one side, as shown at 15, to permit the said socket piece to swing at an angle to the projection 2, as shown in Fig. 2, while the lower end of the bifurcated portion 2 on one side is cut away, as at 16, to permit such movement of the socket-piece, while both of said cutaway portions serve to form stops to limit the movement of said socket piece.

A spring clip or clasp 17 is secured upon the bar E that supports the mud guard, or upon any other portion of the frame of the machine, and receives the ends of the legs 1 when they are pressed together against the action of the spring 14, as shown in Fig. 1, and serves to hold the legs in this position when not in use. It will thus be seen that said supporting device is out of the way while the rider is upon the machine, but, that when he dismounts, all that is necessary is to pull the legs from the spring clasp 17, then swing them on the axle F as a pivot until they project downwardly, then turn the socket piece 16 outwardly on its pivot as shown in Fig. 2, and then allow the spring 14 to spread the legs, whereupon the bicycle can be inclined to one side, as shown in Fig. 2, and will be spread in this position in an obvious manner.

I claim as my invention—

1. A bicycle support comprising a projection 2 adapted to be pivotally secured to a projection on a bicycle, and having two movable legs pivotally secured thereto and provided with a spring for spreading the same apart.

2. A bicycle support comprising a projection 2 adapted to be pivotally secured to a projection on a bicycle, a socket piece 6 pivoted to said projection two legs pivoted to said socket piece and a spring for spreading said legs apart.

3. A bicycle support comprising a projection 2 adapted to be pivotally secured to a projection on a bicycle, and having a bifurcated lower end, a socket piece 6 having an upwardly projecting lug 5 pivoted to said bifurcated end, said lug 5 having a cutaway portion 15 to permit the swinging of said socket piece and to form a stop, and legs pivoted to said socket piece.

4. A bicycle support comprising a projection 2 adapted to be pivotally secured to a projection on a bicycle, a socket piece pivoted to said projection 2, legs pivoted to said socket piece by means of a pivot 9, and a spring 14 secured to said pivot 9 and having arms engaging said legs, substantially as described.

In testimony whereof I affix my signature in presence of two witnesses.

GUSTAVE W. BERT.

Witnesses:
HARRY COBB KENNEDY,
RUDOLPH W. LOTZ.